(12) United States Patent
Ristock et al.

(10) Patent No.: US 8,781,942 B2
(45) Date of Patent: Jul. 15, 2014

(54) SYSTEM AND METHOD FOR MATCHING ELECTRONIC PROPOSALS TO ELECTRONIC REQUESTS

(75) Inventors: Herbert Ristock, Walnut Creek, CA (US); Dave Anderson, Hillsborough, NC (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 1132 days.

(21) Appl. No.: 11/462,279

(22) Filed: Aug. 3, 2006

(65) Prior Publication Data

US 2007/0124231 A1 May 31, 2007

Related U.S. Application Data

(60) Provisional application No. 60/741,385, filed on Nov. 30, 2005.

(51) Int. Cl.
*G06Q 40/00* (2012.01)
*G06Q 40/04* (2012.01)
*G06Q 30/08* (2012.01)

(52) U.S. Cl.
CPC .............. *G06Q 40/04* (2013.01); *G06Q 30/08* (2013.01); *G06Q 40/00* (2013.01)
USPC .......................................................... 705/37

(58) Field of Classification Search
None
See application file for complete search history.

(56) References Cited

U.S. PATENT DOCUMENTS

| | | | |
|---|---|---|---|
| 5,826,244 A * | 10/1998 | Huberman | 705/37 |
| 6,581,040 B1 * | 6/2003 | Wright et al. | 705/8 |
| 7,272,579 B1 * | 9/2007 | Canali et al. | 705/37 |
| 7,386,475 B2 * | 6/2008 | Parasnis et al. | 705/26 |
| 7,461,024 B2 * | 12/2008 | Montgomery | 705/37 |
| 7,475,036 B2 * | 1/2009 | Eyre | 705/37 |
| 7,603,290 B1 * | 10/2009 | Tenorio | 705/26 |
| 2001/0032163 A1 * | 10/2001 | Fertik et al. | 705/37 |
| 2001/0051913 A1 * | 12/2001 | Vashistha et al. | 705/37 |
| 2002/0046147 A1 * | 4/2002 | Livesay et al. | 705/37 |
| 2002/0128959 A1 * | 9/2002 | Kostic et al. | 705/37 |
| 2002/0176404 A1 * | 11/2002 | Girard | 370/352 |
| 2003/0014326 A1 * | 1/2003 | Ben-Meir et al. | 705/26 |
| 2003/0018481 A1 * | 1/2003 | Zhou et al. | 705/1 |
| 2003/0018566 A1 * | 1/2003 | Mackay et al. | 705/37 |

(Continued)

FOREIGN PATENT DOCUMENTS

| | | |
|---|---|---|
| EP | 1624410 A | 2/2006 |
| GB | 2386994 A | 1/2003 |

OTHER PUBLICATIONS

AppleShare 4.2.x: File Server Memory and Cache Usage: at mug.jhmi.edu/mirrors/infoAlley/0496/17/appleshare.html. p. 1-4.*

(Continued)

*Primary Examiner* — Ella Colbert
*Assistant Examiner* — Mary Gregg
(74) *Attorney, Agent, or Firm* — Christie, Parker & Hale LLP

(57) ABSTRACT

A system for receiving bid requests and bid proposals sent thereto over a data-packet-network (DPN) and for matching the bid proposals to the bid requests includes at least one input/output port for receiving the bid requests and the bid proposals, at least one memory utility for storing the bid requests and bid proposals, and a set of machine readable instructions for enabling matching of the stored bid proposals to the stored bid requests.

6 Claims, 5 Drawing Sheets

(56) References Cited

U.S. PATENT DOCUMENTS

| | | | | |
|---|---|---|---|---|
| 2003/0200168 | A1* | 10/2003 | Cullen et al. | 705/37 |
| 2003/0208434 | A1* | 11/2003 | Posner | 705/37 |
| 2003/0225683 | A1* | 12/2003 | Hill et al. | 705/37 |
| 2004/0019579 | A1* | 1/2004 | Herz et al. | 707/1 |
| 2004/0230518 | A1* | 11/2004 | Senga | 705/37 |
| 2005/0060244 | A1* | 3/2005 | Goolkasian et al. | 705/28 |
| 2005/0091136 | A1* | 4/2005 | Buczynski et al. | 705/35 |
| 2005/0149410 | A1* | 7/2005 | Livesay | 705/26 |
| 2005/0154668 | A1* | 7/2005 | Burns et al. | 705/37 |
| 2008/0034290 | A1* | 2/2008 | Woodard | 715/700 |

OTHER PUBLICATIONS

"SIP communications Software Protocol" by vocal Technologies, Ltd, Home page-pp. 1-3. at web.archive.org/web/*/http://www.vocal.com/data_sheets/sip.html—Jun. 6, 2004.*

Wayback documentation Published article SIP commmunications by Vocal Tech.*

Primavera and PurchasePro.com to Create E-Commerce Marketplace for Construction Industry; PrimeContract.com to Bring Together Construction Companies, Project Owners and Suppliers for Buying . . . Business Wire, Sep. 21, 1999; p. 203.*

Wayback documentation Published article SIP commmunications by Vocal Tech; web.archiveorg/web/20040606001405/http://www.vocal.com/data-sheets/sip.htm; Jun. 6, 2004.*

AppleShare 4.2.x: File Server Memory and Cache Usage: at mug.jhmi.edu/mirrors/infoAlley/0496/17/appleshare.html. [] [] p. 1- 4; http://web archiveoorg/web/20030720083553/http://w~w¢ mug.jhmi.ed~;mirrors/InfoAlley; Jul. 20, 2003.*

IETF: "RFC 3261: Session Initiation Protocol" [On Line] Jun. 2002, XP 002463370, Retrieved from the Internet: URL:http://www.ietf.org/rfc3261.txt.

* cited by examiner

SYSTEM AND METHOD FOR MATCHING ELECTRONIC PROPOSALS TO ELECTRONIC REQUESTS

CROSS-REFERENCE TO RELATED APPLICATIONS

The present invention claims priority to a U.S. provisional patent application Ser. No. 60/741,385 filed on Nov. 30, 2005 entitled, "Market-based Distribution of Interaction". The disclosure is included herein at least by reference.

BACKGROUND OF THE INVENTION

1. Field of the Invention

The present invention is in the field of electronic server-based interaction systems and pertains particularly to methods and apparatus for matching electronic bids to electronic requests based on standardized protocols.

2. Discussion of the State of the Art

Session Initiation Protocol SIP is a well-known communication protocol created by the Internet Engineering Task Force (IETF). SIP is used over data networks to initiate and define multi party multimedia telephony and IP sessions including Voice over Internet Protocol (VoIP) and video streamed over the network using one of several known transport protocols such as Real Time Transport Protocol (RTP). In terms of the layers of the suite of Internet protocols, SIP sits in the application layer. In typical use, SIP is somewhat limited in scope to a dedicated purpose of building or initiating multimedia sessions, defining them using session description language (SDP), and then for tearing down those sessions when completed. It has occurred to the inventors that while SIP is not used to transmit documents, it is capable of handling multipart message bodies using MIME or S/MIME headers. Much information about SIP in particular is available at the following Web resource http://www.ietf.org/rfc/rfc3261.txt.

In certain communications environments, large companies routinely compose and then post or send out proposals for other companies or entities that wish to submit formal bids that might be accepted for fulfilling those requests. Such activity involves identification of certain standards of quality, procedure, and like attributes imposed by the project requester on to those entities that might be accepted to fulfill all or a portion of a project. In certain business environments, those standards are somewhat universally understood by all of those who would submit bids for consideration. However, navigating through all of those requirements can be a challenge for some bidders. Moreover, the process of selecting which submitted bids fit all of those criteria is also a very challenging, complex, and time-consuming task.

Therefore, what is clearly needed is a system and methods for communicating those requirements to bidders electronically enabling the bidders system to interpret those requirements and for facilitating automated screening of submitted bids according to the level of conformity of those bids relative to those requirements. A system such as this could reduce much work associated with qualifying bids submitted from multiple bidders.

SUMMARY OF THE INVENTION

A system for receiving bid requests and bid proposals sent thereto over a data-packet-network (DPN) and for matching the bid proposals to the bid requests is provided. In one embodiment, the system includes at least one input/output port for receiving the bid requests and the bid proposals, at least one memory utility for storing the bid requests and bid proposals, and a set of machine readable instructions for enabling matching of the stored bid proposals to the stored bid requests. In one embodiment, the system is implemented as a physical server machine enabled for session initiation protocol (SIP).

In another embodiment, the system is implemented as software on an SIP enabled communication device. In one embodiment, the DPN is an Internet network. In one embodiment, the DPN is a sub-network connected to the Internet network. In one embodiment, the set of machine-readable instructions is implemented as a software application. In another embodiment, the set of machine-readable instructions is implemented in firmware.

In one embodiment, the system further includes a first client interface for generating and submitting bid requests and for displaying results of matching, and a second client interface for generating and submitting bid proposals and for displaying results of matching. In this embodiment, the first and second client interfaces are deployed on SIP enabled computing devices that are remote to the location of matching, the computing devices having network access to the DPN. Also in this embodiment, the computing devices are one of a desktop computer, a Laptop computer, a cellular telephone, or a hand-held computer.

According to another aspect of the present invention, a proxy server for receiving bid requests and bid proposals sent thereto over a data-packet-network (DPN) and for matching the bid proposals to the bid requests is provided. The proxy server includes at least one input/output port for receiving the bid requests and the bid proposals, at least one memory utility for storing the bid requests and bid proposals, and a set of machine-readable instructions for enabling matching of the stored bid proposals to the stored bid requests. In one embodiment, the proxy server is SIP enabled and may initiate communication sessions by proxy on behalf of bidders and requesters.

In a preferred embodiment, the proxy server further includes a database containing data and rules for aiding the matching process. In one embodiment, the at least one memory utility includes a memory queue for storing bid requests and a memory queue for storing bid proposals. In one embodiment, the at least one memory utility is implemented as a volatile memory. In a variation of this embodiment, the volatile memory is random access memory (RAM). In one embodiment, the machine-readable instruction enables screening of bid proposals relative to requirements of a bid request.

According to another aspect of the invention, a method for brokering an electronic bidding process in progress over a DPN is provided. The method includes steps for (a) providing a memory utility connectable to the network for storing bid requests and bid proposals, (b) receiving bid requests and bid proposals and storing them on the memory utility, (c) matching stored bid proposals to bid requests based on enterprise rules and machine-readable instruction, and (d) conveying data about the result of the matching process to the source devices originating the bid requests and the bid proposals. In one aspect, the DPN is the Internet network. In another aspect, the DPN is a sub-network connected to the Internet network.

In one aspect of the method in step (a) the memory utility is server cache memory. In one aspect of the method, in step (b), the bid requests and bid proposals are separately queued. In a preferred aspect, in step (c), the machine-readable instruction is software or firmware. In one aspect, in step (d)

the data is conveyed to external parties over the network-using SIP to initiate communication.

In yet another aspect of the present invention, a machine-readable medium is provided having stored thereon a set of instructions that cause a machine to perform a method including (a) matching bid proposals received in memory to bid requests received in memory; and (b) conveying data about the results of matching to the parties responsible for the bid requests and the matching bid proposals.

BRIEF DESCRIPTION OF THE DRAWING FIGURES

DETAILED DESCRIPTION

Figure 1:
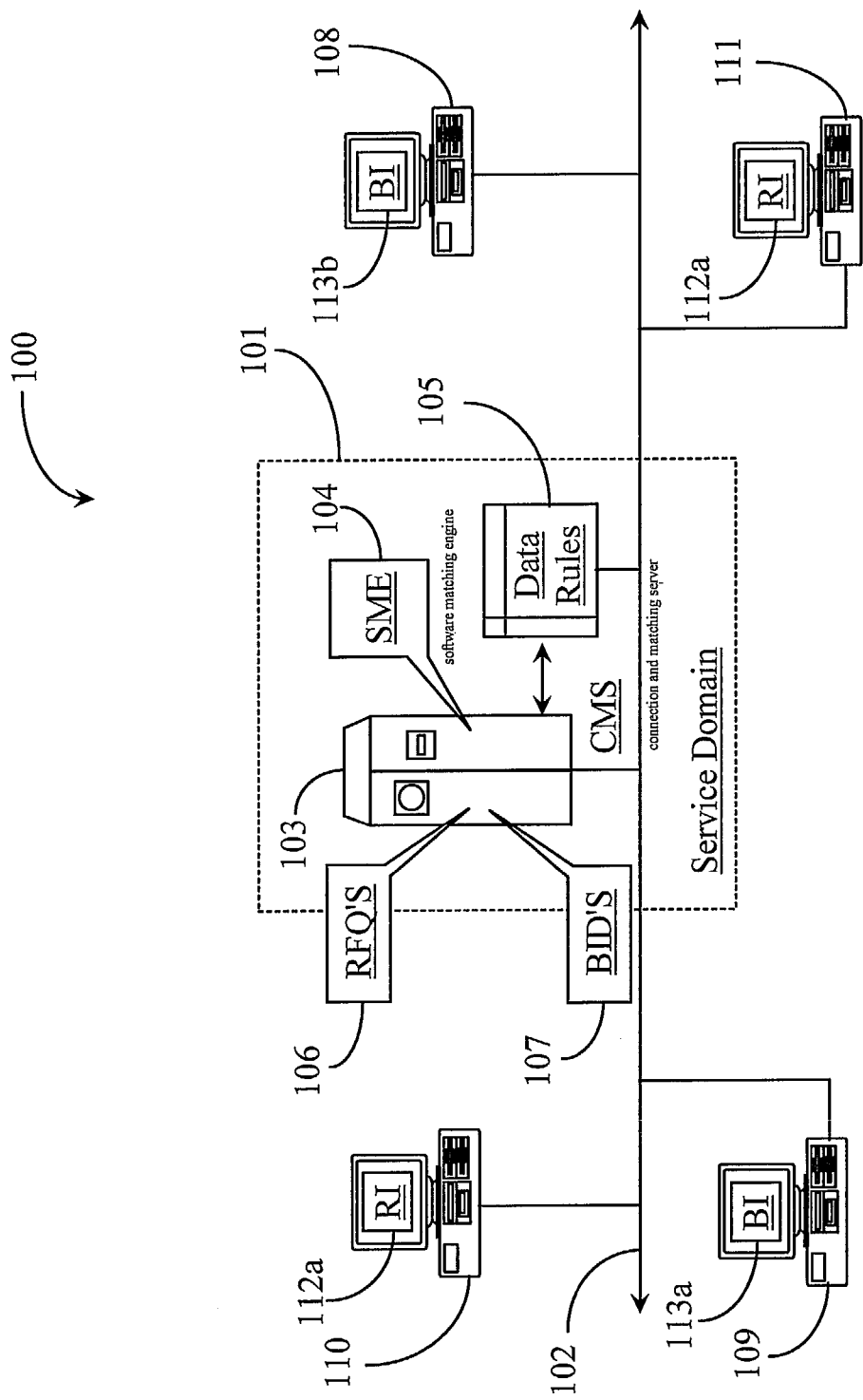
FIG. 1 is a logical overview of an IP network supporting a service for matching enterprise requests to submitted bids according to an embodiment of the present invention.

FIG. 1 is a logical overview of an IP network 100 supporting a service entity 101 for matching enterprise requests to submitted bids according to an embodiment of the present invention. Network 100 may be any type of Internet Protocol IP network logically illustrated herein as network 102. For example, network 102 may be the Internet network, or a subnet having connection to the Internet including an Ethernet, Intranet, or other wired data network. Moreover, the network may encompass wireless connectivity such as Wireless fidelity (WiFi) or other wireless carrier networks servicing cellular telephones and Laptop computers as well as other types of IP-capable communications and collaboration devices like PDAs Blackberry™ devices Palm™ devices and other hand-held devices. The only requirements of the network and end devices are that they are capable of multimedia communication and are enabled for SIP or similar messaging protocols.

Network 102 supports a number of communications stations or devices defined generally as bidder and requestor devices. A bidder device 108 and a bidder device 109 represent computing devices operated by an entity or entities that would submit a bid in response to a request or a bid proposal such as a request for bid or a request for quote. A requestor device 110 and a requestor device 111 represent computing devices operated by an entity or entities that would send out a request or bid proposal to potential bidding entities for the purpose of receiving a response from those entities in the form of a bid or quote.

Use of the terms request, proposal, request for quote (RFQ) bid, and quote throughout this specification is exemplary and meant to be general in nature to represent terminology used in one of several possible embodiments of the present invention. There are other possible applications that may benefit from the methods and apparatus of the present invention where other nomenclatures for a "request" and a "response" might be used without departing from the spirit and scope of the present invention. The inventor deems that a competitive bidding process described herein as one embodiment is representative of a clear and concise embodiment within which the methods and apparatus of the invention may be carried out successfully.

Network 102 supports service domain 101. Service domain or service 101 represents an enterprise that is adapted to offer third party matching services for requesters and bidders. More specifically, service 101 matches competing bids to requests that were initiated and communicated to bidders. Domain 101 typically has a service agreement with one or more enterprises that routinely send out requests for bid or quote that other companies or contractors would then bid on in competition for the offered business. Service 101 has a connection and matching server (CMS) 103 provided therein and connected to network 102 for communication. Connection server 103 is adapted as a contact server, a messaging proxy, and as software or firmware implemented matching engine for matching submitted bids to current requests. There may be more than one server adapted as just described without departing from the spirit and scope of the present invention. For example, in SIP messaging, there may be stateful and stateless proxies, location servers, registration servers and so on. The inventor logically illustrates just one physical server 103 that may be assumed to encompass all required server functions.

In this example, server 103 contains at least two message queues. A queue 106 within server 103 is adapted to contain requests for quote that have been submitted to the service and which are subjects of bidding. A queue 107 within server 103 is adapted to contain bids that have been submitted in response to invitation to bid. Queues 106 and 107 may be implemented using volatile memory such as random access memory (RAM) or dynamic random access memory (DRAM) or other such variants. In one embodiment, a portion of non-volatile memory may be reserved for the purpose. Queues 106 and 107 may be virtual queues and may not be implemented as traditional first in first out (FIFO) queues that one would associate with telephony or the like. Rather they are simply adapted to track each bid stream or request stream in the system using information that is machine readable so that the counterparts (bid to request) may be associated.

Server 103 has a software or firmware implemented matching engine (SME) 104 provided thereto and executable there from. SME 104 is adapted to sort through multiple bids in queue 107 and to match them with the appropriate RFQs in queue 106. In addition to matching bids to RFQs, SME 104 is capable of discerning how closely any particular bid 107 complies with the requirements of a matched RFQ. For example, there will likely be multiple bids that come into queue 107, which match to a single RFQ in queue 106. SME 104 may be adapted to display such as the top 3 bids that match an RFQ based on predetermined rules relating to compliance, pricing, quality standards met, and so on. SME 104 uses a database, illustrated herein as a database 105 to lookup data and rules used in the matching process. Database 105 may be an internal storage or an external storage system without departing from the spirit and scope of the present invention. The inventor illustrates an external storage for illustrative purpose only.

In this example, each participant in the system of the invention has a displayable user interface or client component accessible from the user end device used to generate an RFG or to generate and submit a competing bid. Bidder devices 108 and 109 have bidder interfaces (BI) 113a and 113b available as client plug-ins or standalone programs. Requestor devices 110 and 111 have Requestor interfaces (RI) 112a and 112*b* available. In one embodiment, a single interface may be provided that is capable of displaying results of the bidding process from either the bidder or the requestor perspective. In one embodiment, RI 112*a* and RI 112*b* function also as programs adapted to generate and submit requests for bid and as interfaces to display timely results generated as the result of submission and the matching process performed within service domain 101. Likewise, BI 113*a* and BI 113*b* may function as programs adapted to generate and submit bids in response to requests and as interfaces to display timely results generated as the result of submission and the matching process performed within service domain 101.

In this example, domain 101 is servicing end systems 108-111 using a server 103 whereby results of the bidding process may be made available at those end systems. This should not be construed as a limitation to the practice of the present invention. In other possible configurations, end systems may be telephony systems like answering machines and service domain 101 may publish certain results through an interactive voice response (IVR) system, or make them available to end user through a Web site or Web post. In one embodiment, requesting devices 110 and 111 may send out requests to potential bidders like 108 and 109 using SIP and a copy of that request is also sent to server 103, queue 106 for matching. Bidders receiving an invite to bid may also receive bidding requirements, instructions, and required bid template format for generating a response. In this case, the bidder interface may be used to generate a bid according to the RFQ requirements. In one embodiment, the interface may generate a blank template in the proper format, which a user may then populate with a response. In some cases, the software may automatically populate much of the information if it is data that is routinely used and known to the system.

Once submitted, bids come into service domain 101 and are queued in queue 107 for matching. The bidding process may be adapted as a live real time process in one embodiment. In another embodiment, the process may consist of several asynchronous messages. For example, in a real time embodiment, an invite request for quote may be sent out by server 103 to prospective bidders to bid on. In this case, the bidders would acknowledge the invite and form a connection with server 103 to pass the media accepted as the bid response in the form of a competitive bid deposited at the server into queue 107. The connection between the requester and the server may remain open as well as the connection between the bidders and the server. Therefore, when SME begins processing, information may be passed along that open connection between the server and the bidders and between the server and the requesters.

If devices used as end devices are multitask computing devices, the user interfaces (RI and BI) may operate in the background while connected so that further information may be transmitted from the server, or through the server as a proxy to any party still connected. In this regard a bidder, for example, could receive an alert that a requester who reviewed several matching bids has accepted the bid submitted by a particular bidder. In similar fashion, a requester may receive an alert displaying information about the top 3 bids that matched a particular request.

In an asynchronous embodiment, it may be that live connections between server 103 and the parties to business are only live for the submission of requests and bids in response to those requests. In this case, it may be that a request is posted along with other requests in server 103 and that bidders may browse those requests to determine which to bid on. Once the bidders submit requests, then their connection to the server would be closed. However, once bids are matched to requests, new invites may be generated pertinent to the results of processing within server 103. In such an example, asynchronous message programs like email, IM, real simple syndicate (RSS), FTP, or other transports compatible with SIP may be used to propagate the information.

Figure 2:
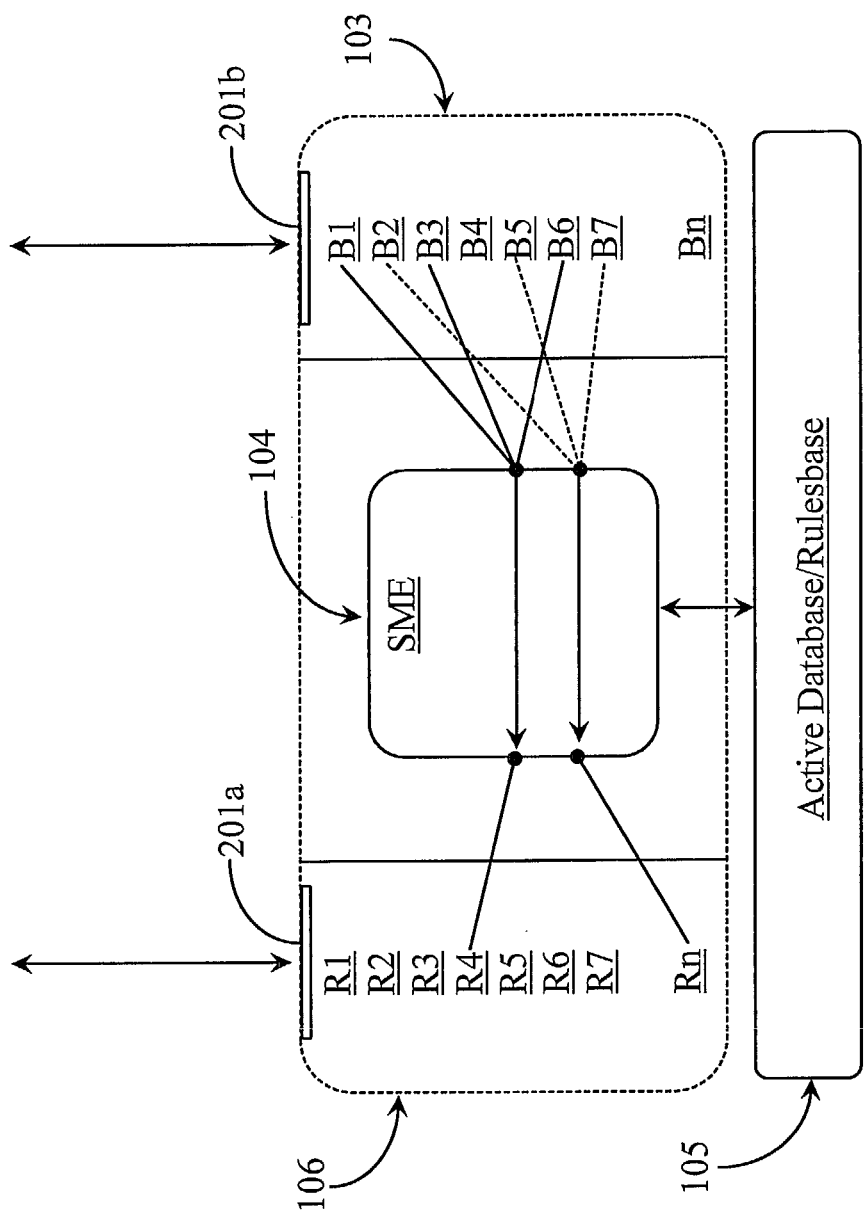
FIG. 2 is a block diagram illustrating a matching engine for matching queued bids to queued requests according to an embodiment of the present invention.

FIG. 2 is a block diagram illustrating matching engine 104 for matching queued bids to queued requests according to an embodiment of the present invention. In one embodiment, server 103 has at least 2 input/output ports. An I/O port 201*a* is provided to server 103 and is adapted to receive request streams. An I/O port 201*b* is provided to server 103 and is adapted to receive bid streams. Other I/O ports may be provided for communication without departing from the spirit and scope of the present invention. Ports 201*a* and 201*b* may also be used to send out data over channels to requestor end devices and bidder end devices. Server 103 is SIP enabled in one embodiment and may send out invites by proxy and may function as a proxy end device without departing from the spirit and scope of the present invention.

In this example, SME 104 is matching received and queued bids to received and queued requests. Database 105 contains the information required for matching. In addition to matching services, SME is intelligently adapted by enterprise rules to determine from a number of bids, which ones more closely fill the goals of a request in terms such as pricing, work quality, references given, estimated time to fulfillment, and other like parameters. SME may rely also on some algorithms to determine which of two or more near identical bids in terms of services promised would be better to fulfill the goals of a request.

In this example, queue 106 contains requests R1 through Rn. Queue 107 contains bids B1 through Bn. SME has determined that bids B1, B3, and B6 match to request R4. SME 104 has determined that bids B2, B5, and B7 match up with request Rn. Bid B4 may match up with either R4 or Rn but may have been screened out in favor of the 3 strongest bids for either request. Information about the 3 strongest bids for R4 may be sent to the end device used to submit R4 through port 201*a*. Similarly, information about the 3 strongest bids for Rn may be sent out to the end device used to submit Rn. The information may then be displayed for the requestor originators in the requestor interface (RI) described earlier. The requesters receiving the information may then make a final selection and relay that information back to server 103. In one embodiment, a requester might revise the requirements or rules and re-submit for another round of bidding. That new request would then overwrite the existing request in queue 106 and bidders would submit a new round of competitive bids.

In one embodiment, bidders may also receive timely data regarding the bidding process such as, for example, that a bid has advanced past the screening process. In one embodiment a requester that is reviewing a bid may provide the bidder with further requests in any media supported by the open SIP connection. For example, Instant messaging, VoIP, media streaming, and like data transfers may occur between a requester and bidder while both are connected to server 103. In another embodiment, subsequent communications and other transactions may occur directly between requestors and bidders. Such other communications and transactions may be initiated through server 103 as a proxy and then established in a way that drops the proxy in the communication path as may be the case in normal SIP established connections.

The exact protocols and rules used for the bidding process may be established in part by requesters, in part by bidders and in part by the service of the present invention. For example, a requester may only see a winning bid instead of the 3 strongest bids. In that case, the decision process related to which bidder will receive a contract may be entirely automated and brokered by the service. In other cases, the decision process is only partly automated leaving some human decision capability to the discretion of a requestor. Similar intelligence may be provided to bidders operating from a bidder interface described earlier. For example, a requester may modify a request to add one or more new requirements not considered in a first round of bidding. In this case bidder software (BI) may be adapted to parse the additional information and incorporate it into the existing bid template or into a new bid template whereby the bid proposal may then automatically populate itself with modified pricing based on enterprise rules at the bidder side.

An example of the scenario described above might be that a requestor has changed a time window, perhaps lengthening the time required for completing a project in a way that results in lower costs to the bidder to complete the project. The change may be detected at the bidders end and a bidders template may automatically populate itself with a cost estimate for the project that is revised to be more competitive. Such rules enabling automated or smart changes in a bid may, of course, be stored and accessed on the system or device used to generate the bids. Bidder rules may be created and activated on the system or device supporting the bidder interface. In one embodiment, bidders may upload their preferences and rules to service 103 and bids in queue may be modified within server 103 with remote permissions given by the bidder.

One possible environment where the system of the invention might be successfully practiced might be that of a plurality of mobile contractors with dispatch able crews that are in the field waiting for work. Requestors might be homeowners that have specific needs that may fit the service descriptions of some of those bidders. In this case, the bidders and their service descriptions may be pre-registered with the service of the present invention to insure that they are included in the bidding process. When a requester sends out an invite to bid, it goes to the service and to all bidders in the local area whose services fit the service requirement of the requestor's those bidders may be operating wireless Laptop computers, Blackberry™ devices, IP-capable cellular telephones, or other devices enabled with SIP or a variation thereof. One possible variation would be SIP for Instant Messaging and Presence Leveraging Extensions (SIMPLE).

One with skill in the art will recognize that the methods and apparatuses of the invention can be applied to a variety of competitive bidding environments without departing from the spirit and scope of the present invention. Another possible environment that may be supported by the methods and apparatus of the present invention is Grant application preparation and submission. In this case, the Grant provider is the requester and the bidders submit applications for Grant. This embodiment may lend more to asynchronous messaging then real time process notification through server 103 as more creative work is typically involved in preparing and submitting an application for grant. However, it is conceivable that for a standardized type of grant, a standard bidding template could be provided and at least populated with much information that is repetitive information such as mission statements, current board members and biographies, and so on.

Figure 3:
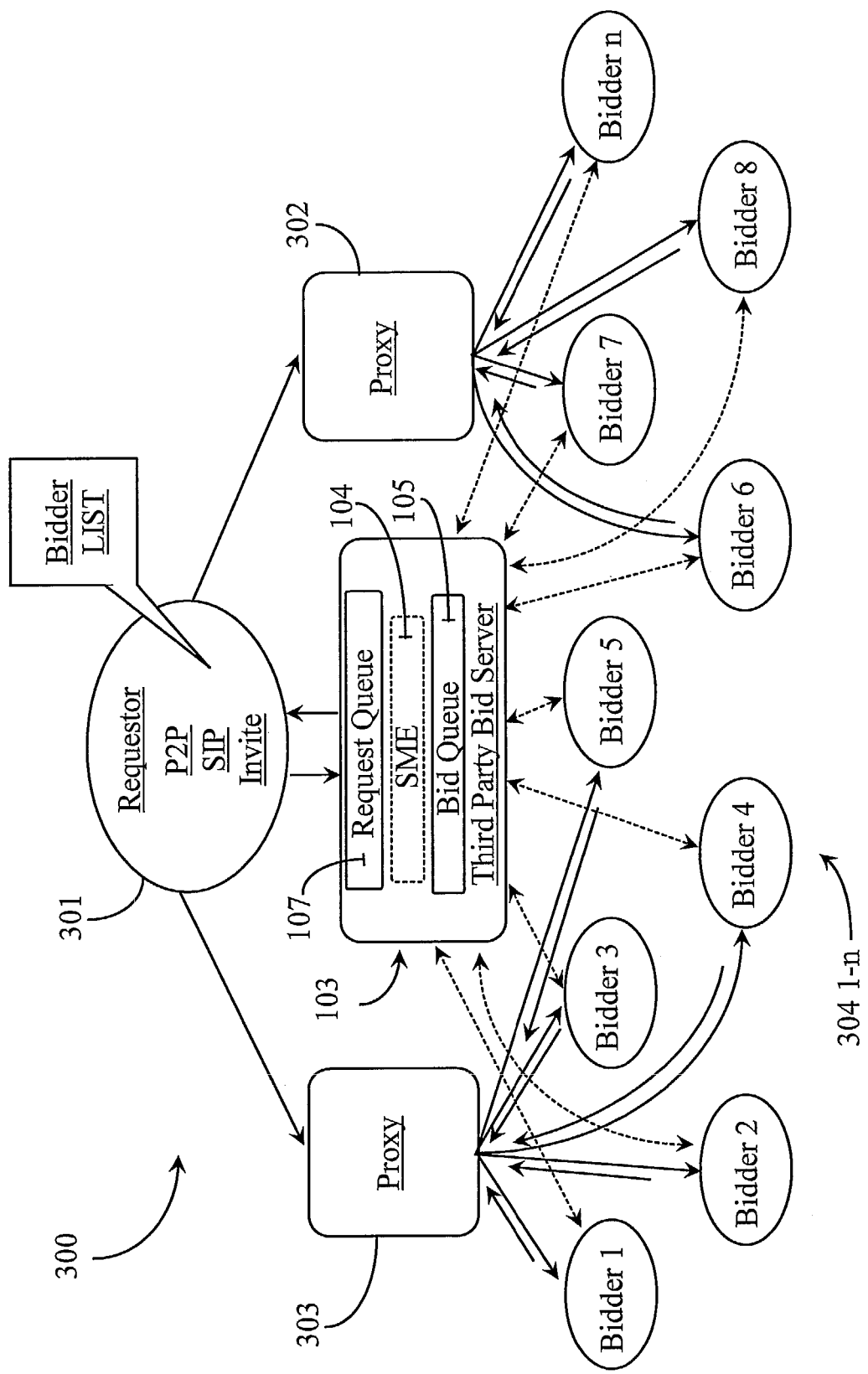
FIG. 3 is a logical overview of an SIP network for inviting bidders to bid on a request submitted by a requester according to an embodiment of the present invention.

FIG. 3 is a logical overview of an SIP network 300 for inviting bidders to bid on a request submitted by a requester 301 according to an embodiment of the present invention. Requestor 301 may generate a P2P SIP invite to bid on a request, and may address the invite to all bidders on a known list of bidders. Typically those bidders, illustrated herein as bidders 304 1-n are registered for SIP location services. In this case, an SIP invite goes out to a proxy server 303 and to a proxy server 302, and to server 103 for queuing and subsequent matching services. In this case, all bidders 304 (1-n) receive invites from proxies 302 and 303 and acknowledge those invites as illustrated by the solid directional arrows between the proxy servers and the bidder devices.

In accordance with SIP, once the bidders are located and have acknowledged an invite, the resulting communications channels may be set up directly between the bidders and, in this case, server 103 bypassing the original servers, which no longer need to be in the loop. The established by directional connections are illustrated in this example as broken directional arrows between bidder devices 304 (1-n) and server 103. Requestor 301 may maintain a live connection to server 103 while bidders may each maintain a live connection to server 103 for the purpose of submitting bids into bid queue 105. Request queue 107 holds the request that is the subject of current bidding. SME then matches bids to requests and may screen out or disqualify some of those bids while the strongest bid or bids may be qualified to have their information forwarded to requester device or system 301.

Some bidders whose bids were screened out may be notified of that state from server 103 while still connected in the original SIP session with server 103. They may then terminate or drop off by sending a "BYE" message. Bidders whose bids have made it to consideration may also be notified of that state and may be advised to wait for confirmation of acceptance, confirmation of failure, or notification of a second round of bidding. SME 104 performs much of the work that otherwise requestor 301 would be required to perform greatly accelerating the process so much so that it could be handled live in many cases. Although there is only one requester illustrated in this example, it will be apparent that there may be many requestors simultaneously using the system to get bids on their projects. It is also noted herein that typically the number of bids in the system may far exceed the number of requests at any given time. Therefore, bid queue 105 may be proportionally larger in memory than request queue 107. In one embodiment, one cache may be used to hold both requests and bids. There are many possibilities.

Figure 4:
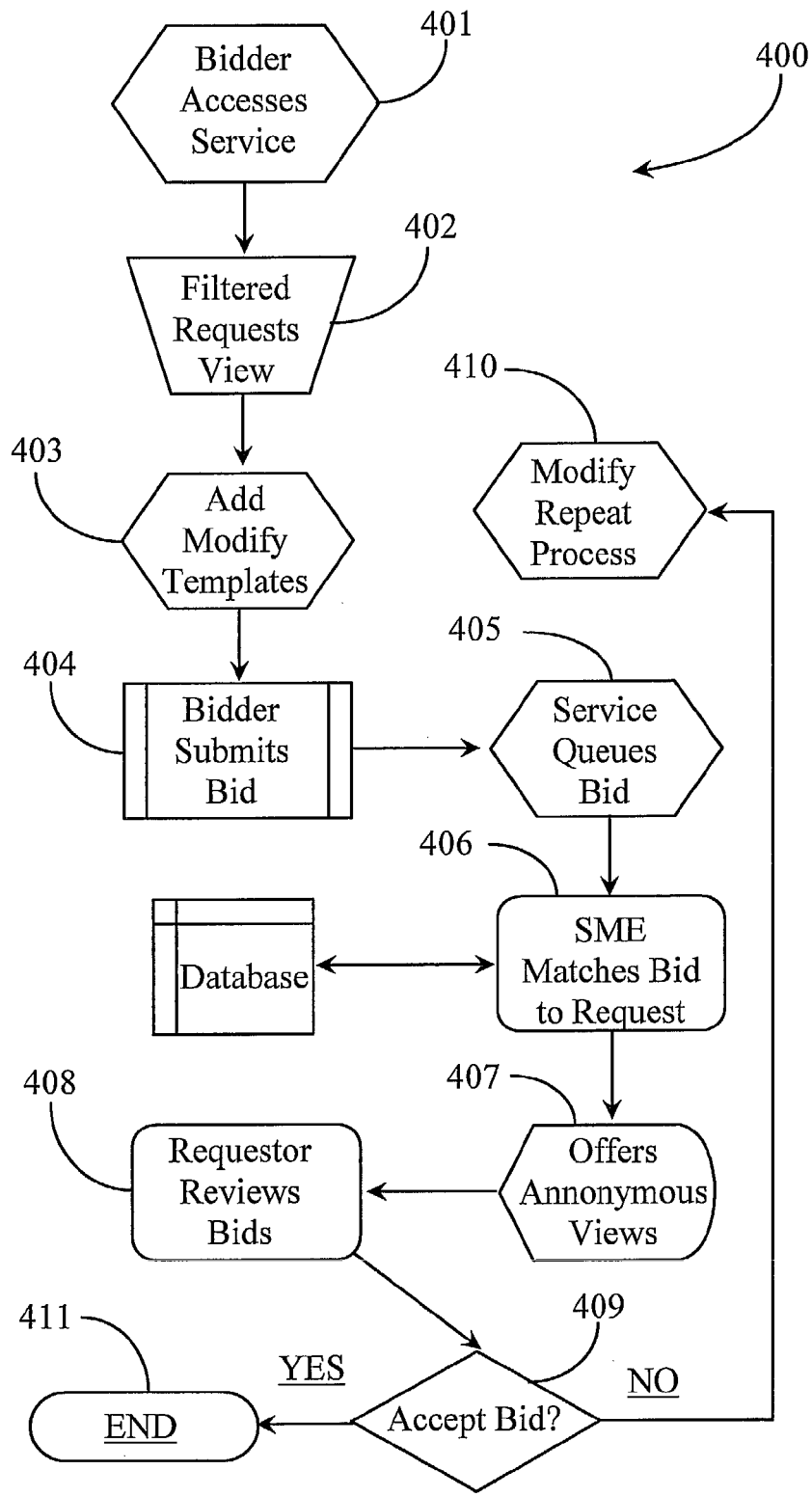
FIG. 4 is a process flow chart illustrating acts for initiating and then completing a bidding process according to an embodiment of the present invention.

FIG. 4 is a process flow chart illustrating a process 400 for initiating a bid and completing the determination process according to one embodiment of the present invention. At step 401, a bidder may simply access the service of the present invention exemplified by service 101 described further above in FIG. 1. In this case, requests that need fulfillment might simply be posted for view. An invite might be sent out to bidders in this case directing them or re-directing them to serve (103) to browse for requests to bid on. In step 402, the bidder may receive a filtered view of the queued requests. For example, only requests that have service requirements matching the advertised services of the bidder would be viewable in the interface.

At step 403, the bidder may add new bidding templates or modify existing templates if required in order to respond to one or more filtered requests. It is presumed that the entire request and the parameters thereof are available at this point to the bidder connected to server 103. The bidder may go offline to create a bid or optionally, the bidder may create and submit a bid while still online with the server. In either case, at step 404 the bidder submits a bid. When the server receives the bid submission, it is immediately queued at step 405.

As soon as the bid enter queue it is subject to bid matching by SME at step 406 consulting during the process with an internal or external database of rules and matching criteria. In one embodiment, there is more processing performed than a simple match or association of a bid to a request. Step 406 may include a pre-screening process governed by enterprise rules and algorithm whereby certain bids may be excluded from any further consideration. At step 407, the service may offer anonymous views of one or more bids that have been matched. Such views may take a variety of forms including appearing on a Web site maintained by the requesting entity. Other forms might include an IM view, a VoIP notification to an automated machine, an email notification, or a live screen pop-up.

At step 408, the requesting entity may review the bid information received that defines and quantifies any relevant bids (determined by the system) that were submitted and matched to the request by the service. At step 409, a requester may make a determination of whether to accept a bid or not to accept a bid. If the requester accepts a bid in step 409, then the process may terminate at step 411 with notification of the acceptance forwarded to the winning bidder. If at step 409, the requestor accepts no bids, then at step 410, the requester may optionally modify and re-submit the request and start a new round of bidding.

It should be noted herein that it is entirely possible that a requester may partially accept a bid, or may elect to have two winning bidders fulfill different requirements of a project. In this case, the winning bidder would each be notified of acceptance for an identified portion of the project they bid on.

Figure 5:
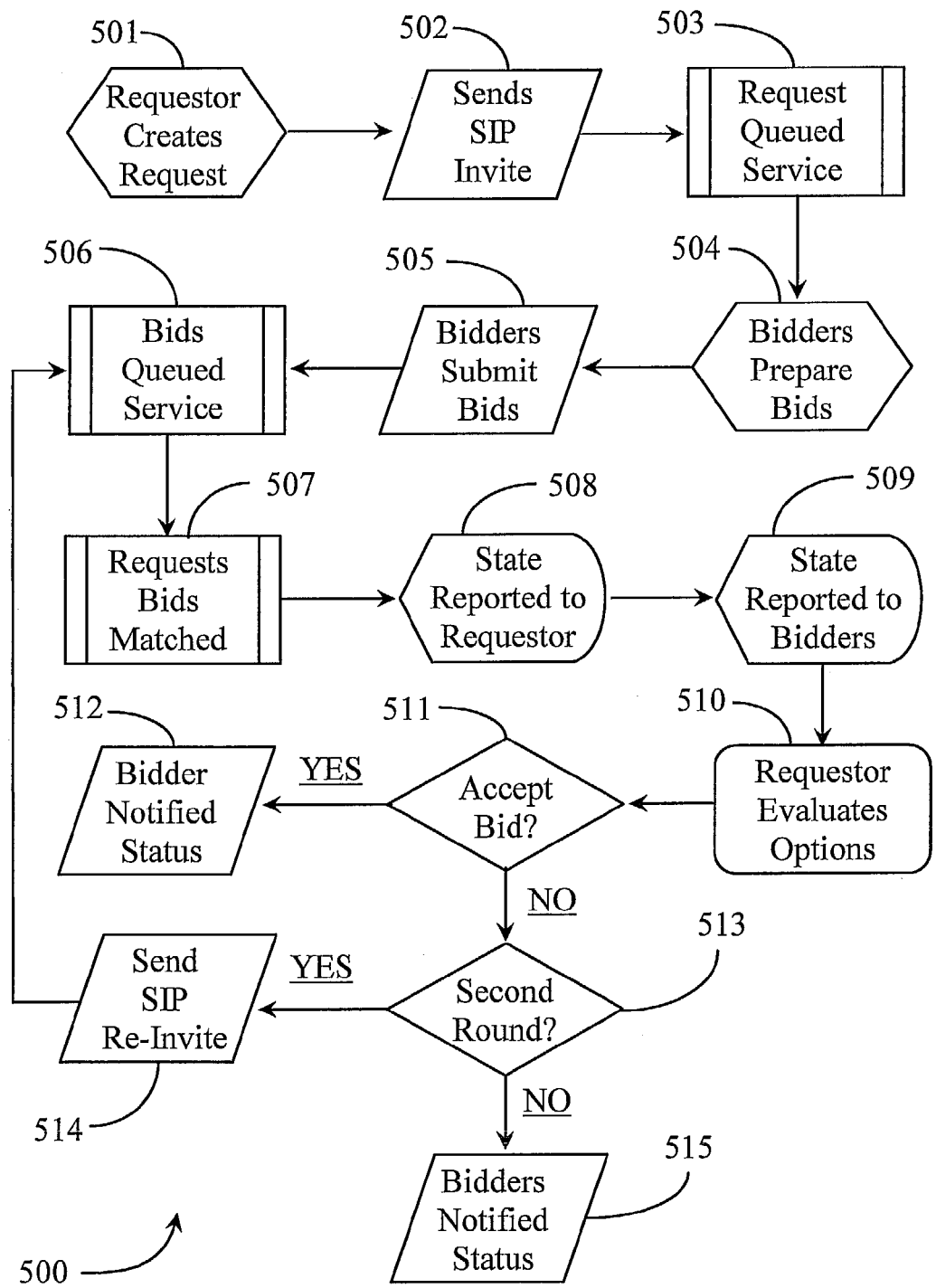
FIG. 5 is a process flow chart illustrating acts for initiating and then completing a bidding process according to another embodiment of the present invention.

FIG. 5 is a process flow chart 500 illustrating steps for initiating and then completing a bidding process according to another embodiment of the present invention. At step 501, a requester creates a request for bid. At step 502 that requester sends an SIP invite to potential bidders that are SIP enabled and registered to receive SIP invites. At step 503, the request is also queued by a third party service analogous to service 101 described with reference to FIG. 1. At step 504 bidders prepare bids for requests received as a result of the invites (and subsequent acknowledgements sent back) sent in step 502. At step 505 bidders submit their bids, which do not go to the requesting device, rather they are redirected or sent directly to the service where they are queued for matching at step 506. In this case, the requesting device may send the original requests through normal SIP channels directly to bidders. However, the bidders in step 505 are directed to submit their prepared bids to the service of the present invention for processing. SIP may also be used to initiate the transactions with the server. In another embodiment, the requester at step 502 sends the request to bid-matching server, which also functions as an SIP proxy server and forwards the request to the bidders, which may acknowledge and which may prepare and submit their responses during the initial SIP sessions with the server.

At step 506, the bids are queued for matching at the service. At step 507, the requests queued and the bids queued are matched. In one embodiment, while the processing occurs in server 103 (FIG. 1), the requestor and the bidders may still be online with the server in the original session. In this embodiment, results of bid processing may be reported to the requestor, and at step 509 certain results of matching may also be reported to the bidders. In another embodiment, the original sessions may be terminated after the server receives and queues the request and the bids. In this case, the server may open new SIP communication channels to the requestor and to appropriate bidders to convey any pertinent processing results.

At step 510, the requester evaluates options related to the bid information received. At step 511, the requester may make a decision to accept a bid or not to accept a bid. If a bid is accepted at step 511 then at step 512 the appropriate bidder is notified and that particular bidding process is complete.

Likewise, step 512 may also include notifying the losing bidders. If at step 511, the requester decides not to accept any bid, at step 513 a decision may be made whether to initiate another bidding round or not. If a new round of bidding is desired, at step 514 the requester may create a new request or modify the existing request and send a re-invite to the bidders either directly or using the server of the present invention as an SIP proxy. In another embodiment, the requester may send a re-invite directly to the bidders and direct them to the server of the present invention as the address to submit their revised bids.

If at step 513, the requester decides to terminate the process and not send a new request, then at step 515 all of the bidders are notified. In the event that step 514 is taken by the requestor, then at step 506 the new bids are queued and it is presumed that the new request is also received and queued as described in step 503 of the process.

It will be apparent to one with skill in the art that the level of information translated in an SIP session between a requestor and a bidder, or between the server of the invention and a bidder may incorporate documents, forms, as well as audio and video media, which may be important in communicating the requirements of the requestor and the details of a bid proposal. By using a third party matching service, much work on both sides of the process may be reduced resulting in faster acceptance times.

It will also be apparent to one with skill in the art of SIP initiated communication that a proxy server may emulate an SIP end device without departing from the spirit and scope of the present invention. Furthermore, original SIP channels may be held open so that real time processing results of the service that matches bids to requests may be conveyed using a variety of media options as long as those options are supported by the session. In addition, new media types may be added to a session by sending SIP re-invites during an open session. In other embodiments original sessions are not necessarily held open during the bid/request matching process. Rather, the server opens new SIP communication sessions with the parties to enable display of the results of the process to both requestors and appropriate bidding parties.

The methods and apparatus of the present invention may be provided using some of or all of the described components without departing from the spirit and scope of the present invention. For example, a requester system may be enabled to match bids to requests locally for itself and thus be adapted with the processing software (SME) and database (rules) without requiring an external server. In this case, the enterprise system would only process its own bids for its own requests.

The service of the present invention may be implemented on an Internet network, an Intranet network, a private or corporate wide area network (WAN) or local area network (LAN) without departing from the spirit and scope of the present invention. In addition, portions of an Internet based marketplace network may include various wireless segments like cellular carrier networks, WiFi networks, or municipal area networks (MAN). In addition, SIP or any suitable extension or variant thereof may be used as the communication session initiator wherein the actual media sessions may include a host of applications without departing from the spirit and scope of the present invention. The spirit and scope of the present invention shall be limited only by the claims that follow.

What is claimed is:

1. A bid management system installed and executed from a computer-readable medium by a network-connected server comprising:

a first portion of software code operating on the server for receiving and storing first requests for bid from a first plurality of persons or enterprises, herein requestors, the requests including specific requirements for a project identified in the bid and are directed to a second plurality of persons or enterprises, herein bidders, the project requirements providing to the bidders specific conditions to be met in making bids directed to the requests for bid made by the requestors;

a second portion of software code operating on the server for providing a bid template to the bidders for submitting bids including conditions according to the project requirements contained in the first requests, and for receiving and storing bids made by the bidders in response to the requests for bid made by the requestors; and a third portion of software code operating on the server matching conditions of the stored bids to the project requirements specified in the stored requests for bid;

wherein bids having conditions matching the project requirements of the first requests are sent to the requestors submitting the requests and when no matched conditions for the bids are found, the first request is modified to add, alter or remove one or more of the project requirements, thereby creating a second request for bid received and stored at the system, and the second request is automatically parsed for altered project requirements by additional software code and the template provided to the bidders is automatically populated with specific conditions provided by the altered project requirements.

2. The system of claim 1, further comprising a fourth software portion for transmitting bids matched to requests for bid to the bidders.

3. The system of claim 1 wherein the template is automatically populated with modified pricing based on established rules at the premises of the bidders according to the altered requirements and a second bid is submitted in response to the second request.

4. The system of claim 1 wherein a single bid match is made and a contract associated with the request and the bid match is entirely automated and brokered by the system between the requestor and the bidder.

5. A bid management method executed by a computerized server connected to a wide area network (WAN), comprising the steps of:
  a) receiving and storing digital files comprising first requests for bid from a first plurality of persons or enterprises, herein requestors, the requestors operating first computerized appliances connected to the WAN, and the requests for bid including specific requirements for a project identified in the bid and are directed to a second plurality of persons or enterprises, herein bidders, the bidders operating second computerized appliances connected to the WAN, the project requirements providing to the bidders specific conditions to be met in making bids directed to the requests for bid made by the requestors;
  b) providing via the WAN an electronic bid template to the bidders for submitting bids according to the requirements contained in the first requests for bid submitted by the requestors;
  c) receiving and storing digital files comprising bids made by the bidders in response to the requests for bid made by the requestors;
  d) matching specific conditions of the stored bids to the project requirements of the stored requests for bid;
  e) modifying the project requirements in the requests for bid when no matches are found, thereby creating a second request for bid providing second specific conditions stored at the system; and
  f) parsing the second request for bid for altered requirements and automatically populating the template with the second specific conditions provided by the altered requirements.

6. The bid management system of claim 5 further comprising a step g) automatically populating the template with modified pricing based on established rules at the premises of the second plurality of persons or enterprises bidders according to the altered requirements and submitting a second bid in response to the second request for bid.

* * * * *